United States Patent
Lombrozo (10) Patent No.: US 9,290,201 B1
(45) Date of Patent: Mar. 22, 2016

(54) DETECTING DRIVER GRIP ON STEERING WHEEL

(71) Applicant: Google Inc., Mountain View, CA (US)

(72) Inventor: Peter Craig Lombrozo, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/543,269

(22) Filed: Nov. 17, 2014

Related U.S. Application Data (63) Continuation of application No. 13/737,541, filed on Jan. 9, 2013, now Pat. No. 8,909,428.

(51) Int. Cl.
| | |
|---|---|
| *B62D 1/00* | (2006.01) |
| *B62D 1/02* | (2006.01) |
| *B62D 6/00* | (2006.01) |
| *B62D 5/04* | (2006.01) |
| *B62D 1/04* | (2006.01) |
| *B62D 6/10* | (2006.01) |

(52) U.S. Cl.
CPC ............. *B62D 5/0481* (2013.01); *B62D 1/04* (2013.01); *B62D 6/008* (2013.01); *B62D 6/10* (2013.01)

(58) Field of Classification Search
USPC ............. 701/41–42; 180/400, 410–412, 180/443–444, 6.2, 6.44–6.5, 272
See application file for complete search history.

(56) References Cited

U.S. PATENT DOCUMENTS

| | | | |
|---|---|---|---|
| 7,321,311 B2 | 1/2008 | Rieth et al. | |
| 7,719,431 B2 | 5/2010 | Bolourchi | |
| 8,099,215 B2 * | 1/2012 | Kuramori | 701/41 |
| 8,881,347 B2 * | 11/2014 | Feinstein | 16/431 |
| 8,909,428 B1 * | 12/2014 | Lombrozo | 701/42 |
| 2009/0065287 A1 | 3/2009 | Kuwabara et al. | |
| 2009/0069981 A1 | 3/2009 | Barthomeuf et al. | |
| 2010/0030429 A1 * | 2/2010 | Kuramori | 701/42 |
| 2011/0187862 A1 | 8/2011 | Ishikawa | |
| 2012/0109418 A1 | 5/2012 | Lorber | |
| 2014/0022070 A1 | 1/2014 | Golomb | |
| 2014/0053371 A1 * | 2/2014 | Feinstein | 16/430 |

* cited by examiner

*Primary Examiner* — Yonel Beaulieu
(74) *Attorney, Agent, or Firm* — Lerner, David, Littenberg, Krumholz & Mentlik, LLP (57) ABSTRACT

Aspects of the disclosure relate generally to determining by what degree a driver is gripping a steering wheel. In one example, a computer may send an electrically assisted power steering system (EPS) motor an excitation command to move. The EPS motor may respond by moving a flexible coupling between the steering wheel and the EPS motor. This may cause a corresponding movement at the steering wheel. A torque sensor may generate pattern data by monitoring the flexible coupling during the movement. The EPS motor may generate system position data for the entire steering system, for example, from the tires to the steering wheel. The pattern data and the system position data may be compared by the computer to determine the degree of grip. In this regard, the computer may determine the degree of a driver's grip without the need for additional sensors.

20 Claims, 8 Drawing Sheets

DETECTING DRIVER GRIP ON STEERING WHEEL

CROSS REFERENCE TO RELATED APPLICATIONS

The present application is a continuation of U.S. patent application Ser. No. 13/737,541, filed Jan. 9, 2013, which issued as U.S. Pat. No. 8,909,428 on Dec. 9, 2014, the disclosure of which is incorporated herein by reference.

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

In some situations, the autonomous vehicle may require the driver to take control of some aspect of control, such as during heavy traffic, poor sensor conditions, etc. When the driver in an autonomous vehicle is prompted to take control there is an immediate need to establish if the driver has actually done so satisfactorily. For example, it may be very unsafe for the autonomous components to make the assumption that simply because the driver was alerted to take control that he did. If the driver did not, the vehicle could disengage from the task of maneuvering the vehicle and possibly cause an accident. Various systems use different transition or hand-off confirmation methods. For example, requiring the driver to push a button upon transition might constitute a satisfactory hand-off. Some systems may engage in an autonomous mode as soon as the vehicle detects that the driver releases the steering wheel suing, for example, a force sensor added to the steering wheel, steering column, etc.

BRIEF SUMMARY

One aspect of the disclosure provides a method. The method includes sending an excitation instruction to move a steering wheel of a vehicle to an electrically assisted power steering system (EPS) motor; in response to receiving the excitation instruction, moving, by the EPS motor, the steering wheel; monitoring the movement of the steering wheel by the torque sensor; generating, by the torque sensor, pattern data based on the monitoring; generating, by the EPS motor, system position data for a steering system of the vehicle; and determining, by a processor, whether a driver is gripping the steering wheel based on the pattern data and the system position data.

In one example, moving of the steering wheel includes oscillating, by the EPS motor, a flexible coupling which causes the steering wheel to oscillate. In another example, monitoring the movement of the steering wheel by the torque sensor includes monitoring a flexible coupling between the steering wheel and the EPS motor. In another example, the method also includes, before moving the steering wheel, performing calibration based on a characteristic of the driver thereby increasing the accuracy of the determination of whether the driver is gripping the steering wheel. In another example, the method also includes, before moving the steering wheel, performing calibration based on a characteristic of the steering system thereby increasing the accuracy of the determination of whether the driver is gripping the steering wheel. In another example, determining whether the driver is gripping the steering wheel is further based on a comparison of the system position data and the pattern data. In another example, the method also includes, when the processor determines that the driver is gripping the steering wheel based on the pattern data and the system position data, the processor also determines a degree of the gripping based on the pattern data and the system position data. In another example, the method also includes determining, by the EPS motor, an amount of power required to move the steering wheel according to the excitation command; comparing a value indicative of the amount of power to a threshold value; and determining whether the driver is gripping the steering wheel is also based on the comparison.

In another example, the method also includes determining, by the EPS motor, an amount of power required to move the steering wheel according to the excitation command; comparing a value indicative of the amount of power to a first threshold value and a second threshold value, wherein the second threshold value is greater than the first threshold value; and when the processor determines that the driver is gripping the steering wheel based on the pattern data and the system position data, the processor also determines a degree of the gripping based on the comparison. In this example, when the value indicative of the threshold value is greater than the first threshold value but less than the second threshold value, the processor determines the degree of the gripping to be a first degree, and when the value indicative of the threshold value is greater than the second threshold value, the processor determines the degree of the gripping to be a second degree, wherein the second degree indicates a stronger gripping force than the first degree.

Another aspect of the disclosure provides a method. The method includes sending an excitation instruction to move a steering wheel of a vehicle to an electrically assisted power steering system (EPS) motor; in response to receiving the excitation instruction, moving, by the EPS motor, the steering wheel; determining, by the EPS motor an amount of power required to move the steering wheel; comparing a value indicative of the amount of power to a threshold value; and determining whether a driver is gripping the steering wheel based on the comparison.

In one example, moving the steering wheel includes oscillating, by the EPS motor, a flexible coupling which causes the steering wheel to oscillate. In another example, the threshold value is a first threshold value, and the method also includes comparing the value indicative of the amount of power to a second threshold value, wherein the second threshold value is greater than the first threshold value, and when the processor determines that the driver is gripping the steering wheel based on the comparison to the first threshold value, the processor further determines a degree of the gripping based on the comparison to the second threshold value. In this example, when the value indicative of the threshold value is greater than the first threshold value but less than the second threshold value, the processor determines the degree of the gripping to be a first degree, and when the value indicative of the threshold value is greater than the second threshold value, the processor determines the degree of the gripping to be a second degree, wherein the second degree indicates a stronger gripping force than the first degree.

In another example, the method also includes, before moving the steering wheel, performing calibration based on a characteristic of the driver thereby increasing the accuracy of the determination of whether the driver is gripping the steering wheel. In another example, the method also includes, before moving the steering wheel, performing calibration based on a characteristic of the steering system thereby increasing the accuracy of the determination of whether the driver is gripping the steering wheel.

A further aspect of the disclosure provides a system. The system includes a processor configured to send an excitation instruction to move a steering wheel of a vehicle. The system also includes an electrically assisted power steering system (EPS) motor configured to receive the instruction and respond by oscillating the steering wheel. The EPS motor is also configured to generate system position data for a steering system of the vehicle. The system also includes a torque sensor for monitoring the movement of the steering wheel in response to the excitation command and generating pattern data based on the monitoring. The processor is also configured to determine whether a driver is gripping the steering wheel based on the pattern data and the system position data.

Yet another aspect of the disclosure provides a system. The system includes a processor configured to send an instruction to oscillate a steering wheel of a vehicle to an electrically assisted power steering system (EPS) motor; receive from the EPS motor system position data for a steering system of the vehicle from one or more tires of the vehicle to the steering wheel; receive from a torque sensor pattern data based on oscillation of the steering wheel by the EPS motor; and determine whether a driver is gripping the steering wheel based on the pattern data and the system position data.

Another aspect of the disclosure provides a system comprising a processor. The processor is configured to cause and electrically assisted power steering system (EPS) motor to move a steering wheel of a vehicle; receive, from the EPS motor, a value indicative of the amount of power used by the EPS motor to cause the steering wheel to move; compare the value to a threshold value; and determine whether a driver is gripping the steering wheel based on the comparison.

A further aspect of the disclosure provides a non-transitory, tangible computer-readable storage medium on which computer readable instructions of a program are stored. The instructions, when executed by a processor, cause the processor to perform a method. The method includes sending an excitation instruction to move a steering wheel of a vehicle to an electrically assisted power steering system (EPS) motor; receiving from the EPS motor system position data for a steering system of the vehicle; receiving from a torque sensor pattern data based on movement of the steering wheel by the EPS motor; and determining whether a driver is gripping the steering wheel based on the pattern data and the system position data.

DETAILED DESCRIPTION

The disclosure relates generally to determining whether and by what degree a driver is gripping a steering wheel. In one aspect, in order to measure the driver's grip, a computer may send an electrically assisted power steering system (EPS) motor an excitation command to move the steering wheel. The EPS system may receive this information at the EPS motor, and the EPS motor may respond by moving, for example oscillating, a flexible coupling between the steering wheel and the EPS motor. The movement of the flexible coupling may also cause a corresponding an excitation movement at the steering wheel.

A torque sensor may generate pattern data by monitoring the flexible coupling between the EPS motor and the steering wheel. The EPS motor may also generate system position data for the excitation motion of the steering system. The pattern data and the system position data may be sent by the EPS motor and received by the computer. The computer may then compare the system position data and the pattern data to determine the degree of grip.

Figure 1:
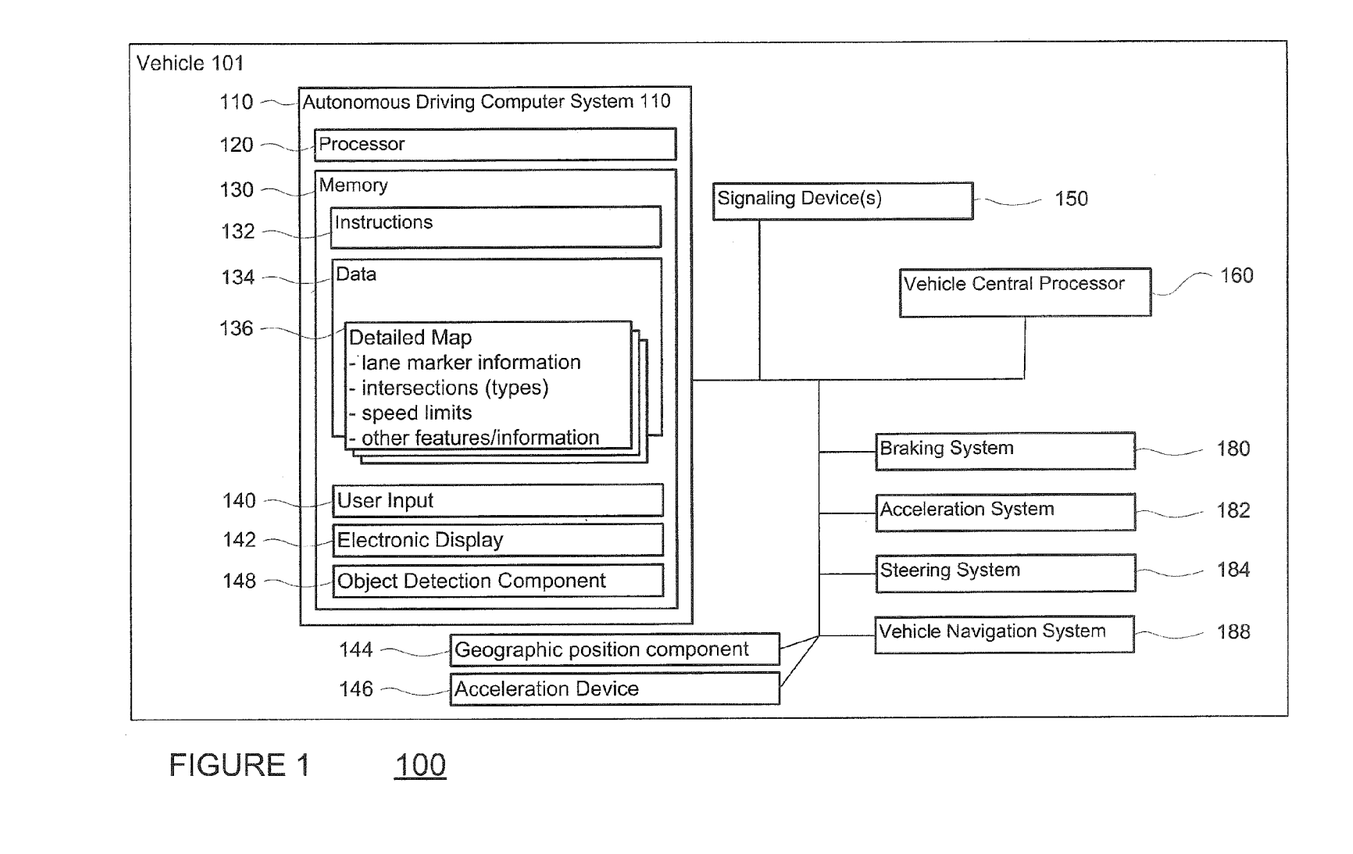
FIG. 1 is a functional diagram of a system in accordance with aspects of the disclosure.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method are not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC. Although FIG. 1 functionally illustrates the processor, memory, and other elements of computer 110 as being within the same block, the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor(s) that only performs calculations related to the component's specific function.

In various aspects described herein, the processor may be located remotely from the vehicle and communicate with the vehicle wirelessly. In other aspects, some of the processes described herein are executed on a processor disposed within the vehicle while others are executed by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
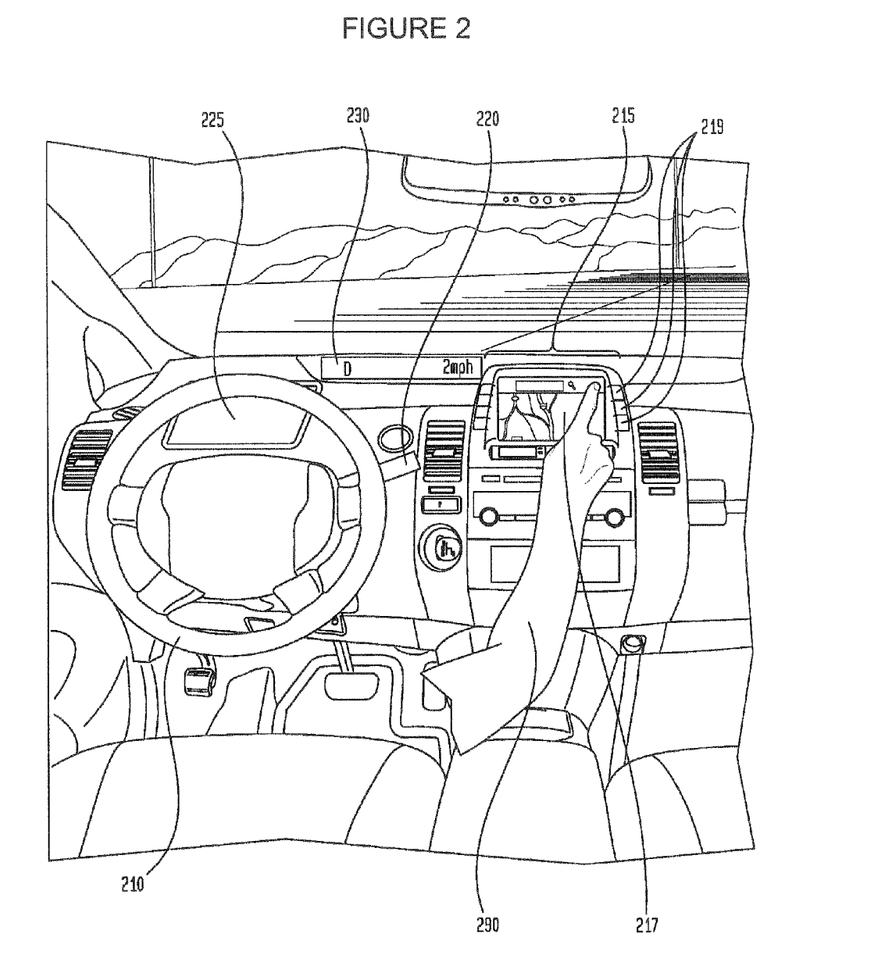
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, steering 184, and navigation 186 systems in order to control the movement, speed, etc., of vehicle 101. In addition, when engaged, computer 110 may control some or all of these functions of vehicle 101 and thus be fully or merely partially autonomous. Although various systems and computer 110 are shown within vehicle 101, these elements may be external to vehicle 101 or physically separated by large distances.

The computer may control the direction and speed of the vehicle by controlling the various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3:
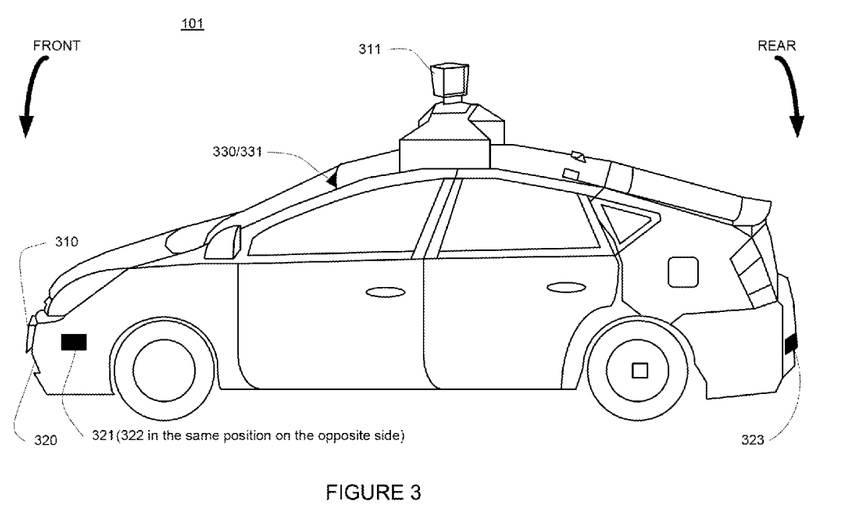
FIG. 3 is an exterior of an autonomous vehicle in accordance with aspects of the disclosure.

The vehicle may also include components 148 for detecting objects and conditions external to the vehicle such as other vehicles, obstacles in the roadway, traffic signals, signs, trees, etc. As shown in the example of FIG. 3, the detection system may include lasers 310, 311, sonar, radar detection units 320-23 (such as those used for adaptive cruise control), cameras 330, 331, or any other detection devices which record data which may be processed by computer 110. The aforementioned sensors may allow the vehicle to understand and potentially respond to its environment in order to maximize safety for passengers as well as objects or people in the environment.

In addition to the sensors described above, the computer may also use input from other sensors. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time. That is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors and other computers, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, intersections, crosswalks, speed limits, traffic signals, buildings, signs, real time traffic information, or other such objects and information.

Figure 4:
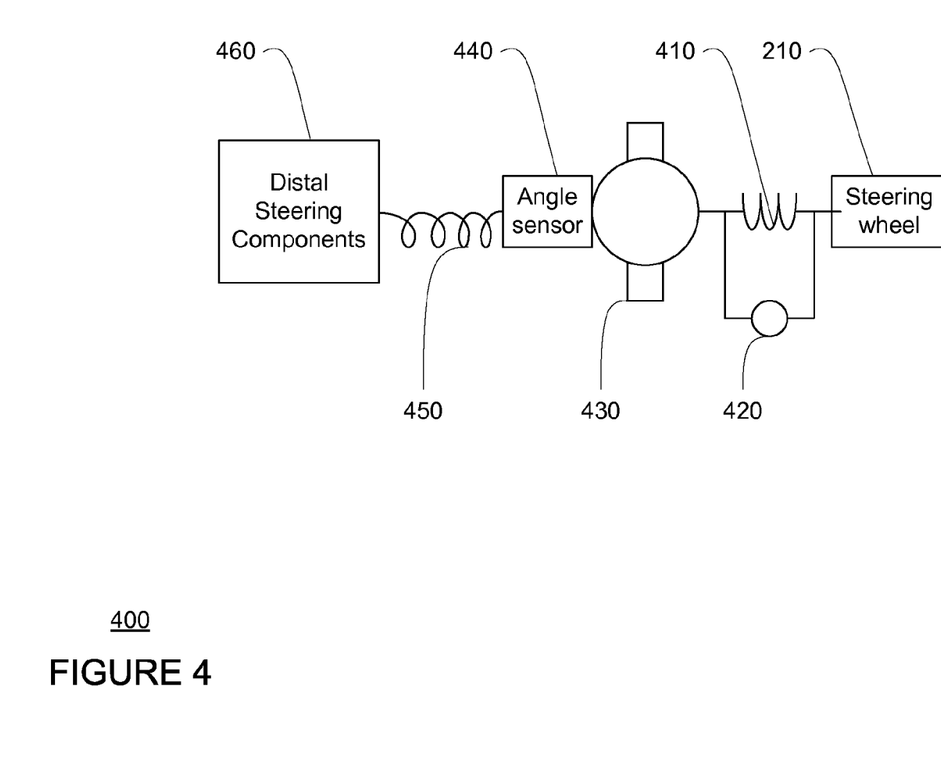
FIG. 4 is a diagram of an electrically assisted power steering system in accordance with aspects of the disclosure.

In one example, steering system 184 may include an electrically assisted power steering system (EPS) such as those found in non-autonomous vehicles. FIG. 4 is a simplified example diagram of an EPS 400. For example, in the EPS 400 a driver turns a steering wheel 210 which manipulates a flexible coupling 410. A torque sensor 420 monitors the status of the flexible coupling 410 and captures the motion of the flexible coupling caused by the driver's action at the steering wheel 210. For example, by turning the steering wheel 210 by some angle, the driver may also twist the flexible coupling 410. This twisting is measured or captured by the torque sensor 420. The torque sensor 420 then sends this information to an EPS motor controller such as an electronic circuit or microprocessor associated with EPS motor 430.

The EPS controller receives this information and acts to cancel the motion of the flexible coupling 410 by driving EPS motor 430. The EPS motor 430 moves the distal steering components 460 such as the axles, tires, etc. via coupling 450. An angle sensor 440 associated with the EPS motor 430 allows the EPS motor to determine the angle of the distal steering components 460, including the tires. In this regard, the EPS motor 430 acts to eliminate differences between the angle of the steering wheel and the angle of the tires. In this example, coupling 450 may represent all of the vehicle futures between the EPS motor and the distal steering components which allow the EPS motor to adjust the distal steering components.

Figure 5:
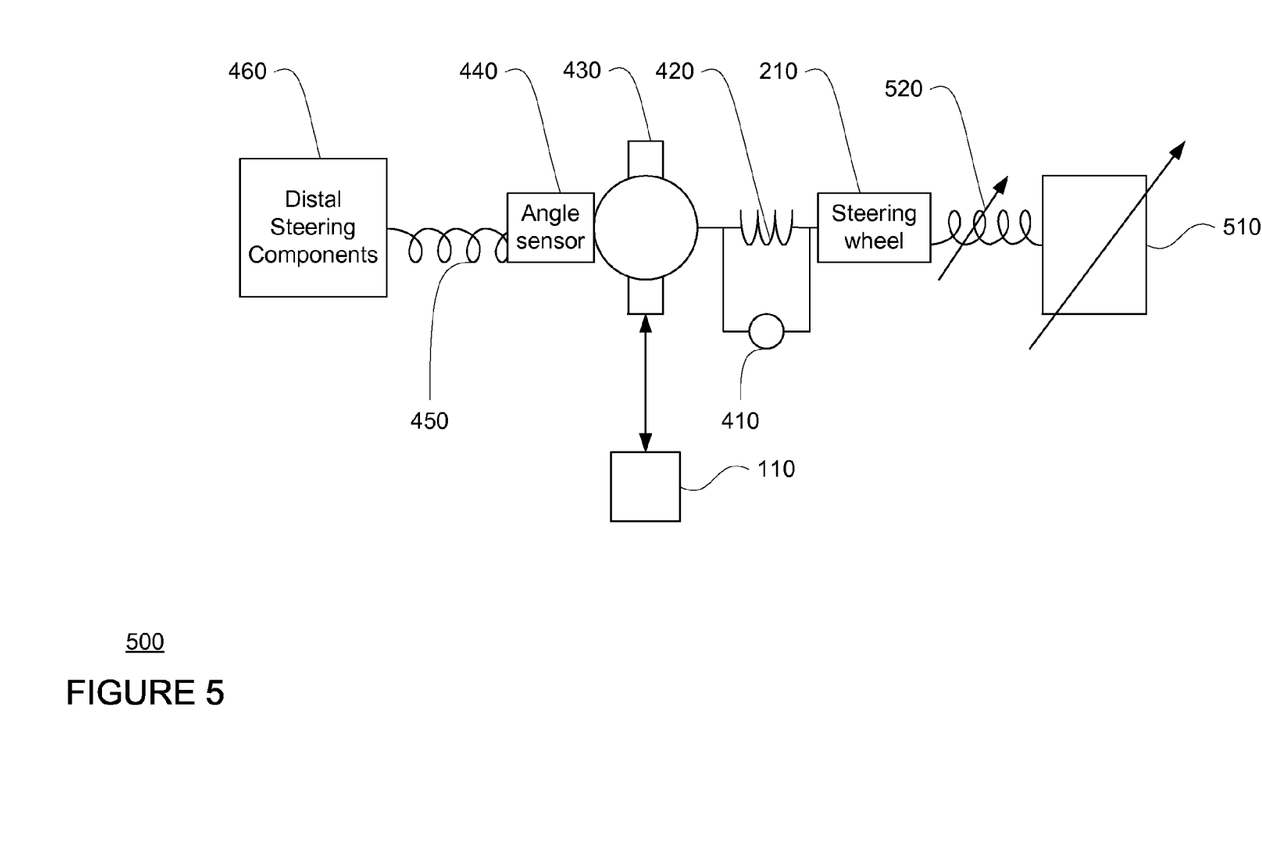
FIG. 5 is diagram of another electrically assisted power steering system in accordance with aspects of the disclosure.

FIG. 5 is a simplified example of another EPS 500 in accordance with the present disclosure. In this example, box 510 represents an effective mass of the driver's arms on the steering wheel 210. The compliance in grip 520 represents how hard, or rather the amount of force the driver is applying to the steering wheel by hanging on with his or her hands. In this example, computer 110 is able to send and receive information with the EPS motor 430 and angle sensor 440. This may include information such as that generated by the torque sensor 420 as well as commands or other instructions.

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, the disclosure relates generally to determining whether and by what degree a driver is gripping a steering wheel. In order to measure the driver's grip, computer 110 may send the EPS motor 430 an excitation command. For example, this excitation command may include oscillating at very small angles, for example less than 1 degree. The greater the angle, the more sensitive the grip sensing ability of system 500. In addition to a sinusoidal input, the excitation may also include a square wave, a pulse, or other motion. This movement of the motor may cause a corresponding excitation motion by the flexible coupling 420, which in turn, causes the steering wheel 210 to move. For example, if the EPS motor oscillates the flexible coupling, this may cause the steering wheel to oscillate. The motion of the steering wheel may track the motion of the motor with a small phase delay and at a different amplitude.

The driver may experience a very small motion (wheel jerk, buzz, or wiggle) of the steering wheel based on the type of excitation command received and executed by the EPS motor. Depending on his or her grip, the driver may make some effort to compensate. This compensation effort, or the compliance in grip 520, as well as state of all of the mechanical components, including the flexible coupling 410, from the steering wheel to the driver may be recorded by the torque sensor 420. In this regard, the torque sensor 420 may record and output data including a pattern that represents the movement of the steering wheel 210 caused by the oscillations as well as any response by the driver.

The torque sensor 420 may send the output pattern data to the EPS motor 430. The EPS motor angle sensor 440 may process this data then send the processed (or raw) pattern data to computer 110 for further processing. The angle sensor 440 may also provide position data regarding the excitation motion of the entire steering system 184, for example, from the distal steering components 460 to the steering wheel 210 to computer 110. This position data may include an angular position reading equal to the angular position of the EPS motor. The steering angle may be described by a mathematical function of the geometry of the distal components including any gearing and conversion to linear motion at the steering rack.

The computer 110 may then compare the pattern data to the position data regarding the excitation motion of the entire steering system in order to identify the driver's compensation effort or the compliance in grip 520.

Through the use of electronic circuitry, software or both, the torque sensor output data may be characterized. For example, in the case of a sinusoid output, this output may include would have amplitude and phase measurements. In the case of a more complex response, additional parameters may be needed to accurately define the response pattern. The form of the response (sinusoid, compound sinusoid, exponential, etc.) may be used to determine the descriptive parameters. Given the mathematical description of the excitation pattern and the response pattern, the transfer function of the system can be calculated.

In some examples, the transfer functions describing a free steering wheel, a loosely-gripped wheel, and a tightly-gripped wheel will differ by the magnitude of a few key parameters in the mathematical description of the transfer function. These may be compared with a threshold method as described, or with a table of experimentally-derived values. If the excitation waveform is always consistent by design then the transfer function does not need to be calculated, and the response alone can be characterized and used to determine the grip.

In one example, if the EPS motor 430 causes the steering wheel to turn to the right or left some small amount very quickly, the compared data may show that there is very little torque measured at the torque sensor, and there is a large phase delay in the response. Low torque measurements may indicate that the steering wheel is free to move and track the motion of the EPS motor. A larger delay may indicates that the motion of the steering wheel tends to oscillate freely displaying larger torque values during direction reversals in the cycle. In this example, there may be very little or no driver mass 510 and little or no coupling to the driver mass in grip 520, and thus, the computer 110 may determine that the driver's grip is non-existent or very light.

In another example, if the EPS motor 430 causes the steering wheel to turn to the right or left some small amount very quickly, the compared data may show that the output measured from the torque sensor may be high in amplitude and the phase of the signal may be close to the phase of the EPS motor excitation signal. High torque readings may indicate that the steering wheel angular position is not tracking the EPS motor very closely, and a small phase delay may indicate that as soon as the EPS motor begins to rotate, the torque (indicating the increasing difference in angular position between the EPS motor and steering wheel) begins to increase. In this example, the driver mass 510 may be high, and the coupling in grip 520 to the driver mass may also be relatively large, and thus, the computer 110 may determine that the driver's grip on the steering wheel 210 is much more significant, or rather, that the driver is holding the steering wheel 210 securely, reducing the ability of the EPS motor 430 from moving it.

Figure 6A:
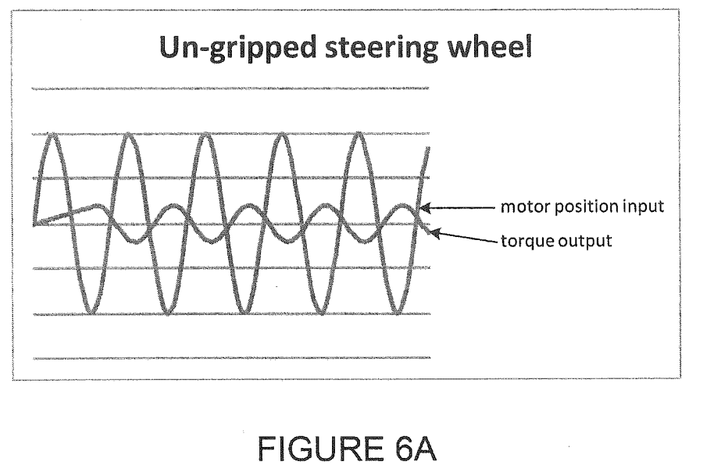
FIGS. 6A and 6B are example flow diagrams in accordance with aspects of the disclosure.
Figure 6B:
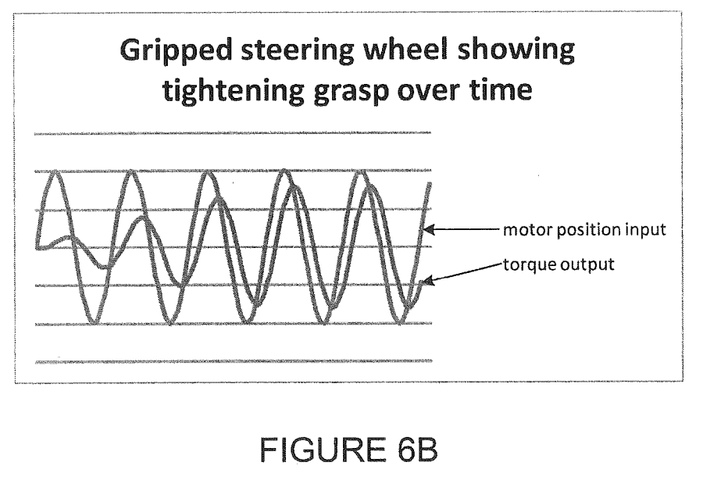

The graphs of FIGS. 6A and 6B provide examples of data recorded by a torque sensor and the angle sensor 440 cause by an excitation command to oscillate the steering wheel. For example, FIG. 6A is an example employing an ungripped steering wheel while FIG. 6B is an example employing a gripped steering wheel showing a tightening grip over time. The motor position input includes data recorded by an angle sensor and the torque output includes data recoded by a torque sensor. These figures demonstrate the different torque patterns generated under different gripping circumstances.

Figure 7:
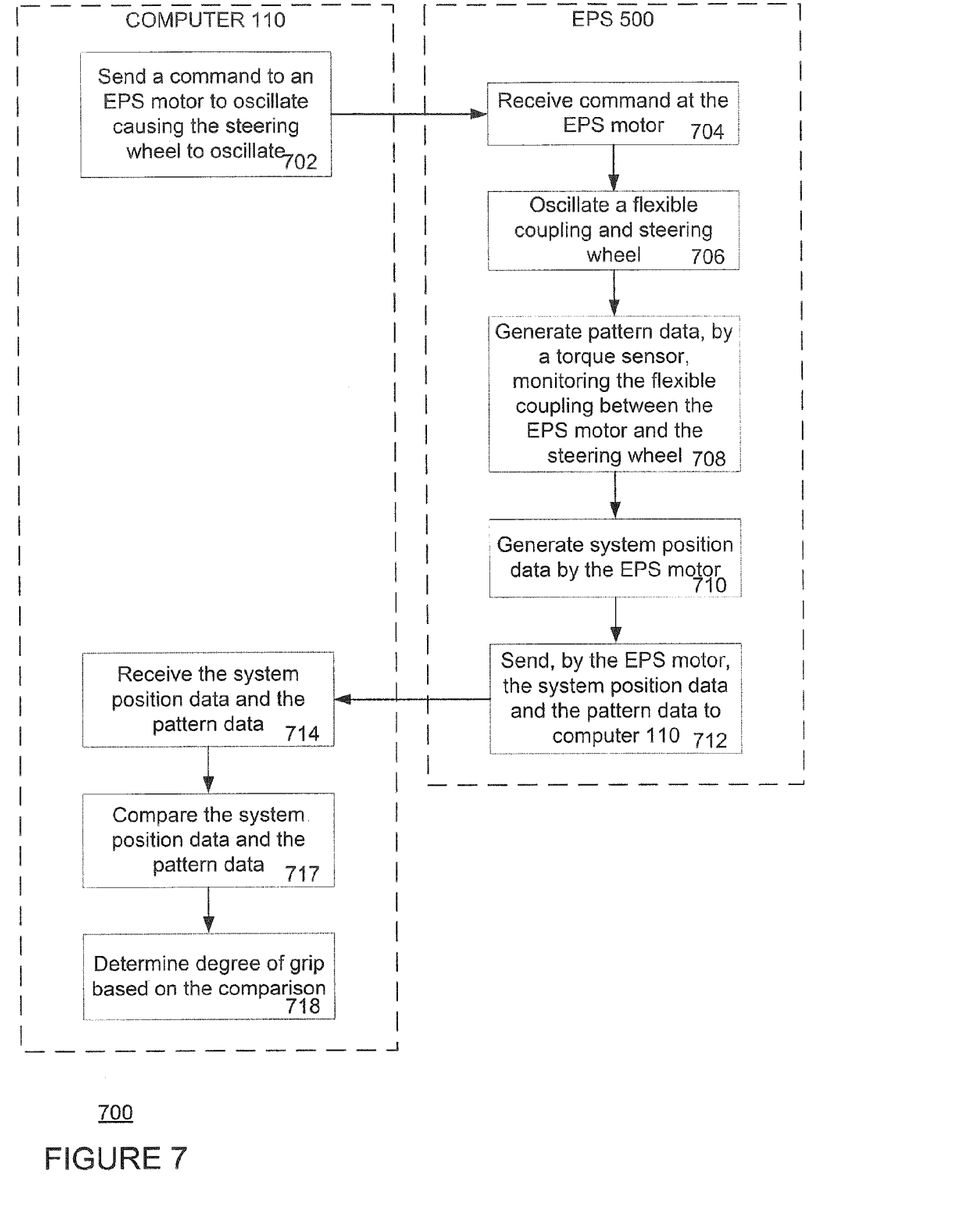
FIG. 7 is another example flow diagram in accordance with aspects of the disclosure.

FIG. 7 is an example process 700 by which a degree of a driver's grip may be determined. In this example as shown at block 702, in order to measure the driver's grip, computer 110 may send an EPS motor of EPS system 500 a command to oscillate at very small angles. As noted above, rather than oscillating using a smooth sinusoidal input, other types of motion may also be used. The EPS motor receives this information at block 704, and the EPS motor responds by oscillating the flexible coupling and, as a consequence the steering wheel oscillates at block 706.

A torque sensor generates pattern data by monitoring the flexible coupling between the EPS motor and the steering wheel at block 708. The EPS motor (or an additional sensor if required) also generates system position data at block 710. The pattern data and the system position data are received by computer 110 at blocks 712 and 714, respectively. The computer 110 then compares the system position data and the pattern data at block 717. The computer 110 then determines the degree of grip based on this comparison at block 718.

In addition or as an alternative to comparing data to determine the driver's grip as described above, the computer 110 may use the EPS motor 430 as another sensor, as the motion of the EPS motor is also dependent upon what the compliance in grip is. If the driver is not gripping the steering wheel or doing so lightly, the motor will require less power. Similarly, if the driver is gripping the steering wheel with greater force the motor will require more power.

For example, when the EPS motor 440 causes the steering wheel 210 to move left and right by some angle, but the driver is not holding on, the EPS motor 440 may cause the steering wheel 210 to move with a relatively small effort or without using much power. However, the stronger or more force of the driver's grip on the steering wheel, the more effort the EPS motor 440 may be required to use to move the steering wheel accordingly. The same change in the angle of the steering wheel may require more power, the effect on the steering wheel may happen slower, etc. Thus, the amount of power required by EPS motor 440 to move steering wheel 210 by some angle may also be used by computer 110 to determine the driver's grip on the steering wheel.

In this regard, the EPS motor 440 may determine the amount of power required to oscillate (or make some other motion) the flexible coupling and the steering wheel. The EPS motor 440 may send this information, for example as a value indicative of the amount of power determine by the EPS motor, to computer 110. Computer 110 may compare this value to a threshold value or a range of threshold values to determine whether and to what degree the driver is gripping the steering wheel.

In one example, a single threshold may be used to determine if the driver is holding onto the steering wheel or not holding onto the steering wheel. If the value indicative of the amount of power is at or below the threshold value, the computer may determine that the driver is not holding onto the steering wheel. If the value indicative of the amount of power is above the threshold value, the computer may determine that the driver is holding onto the steering wheel. In this example, the result may be a binary, yes or no, the driver is or is not gripping the steering wheel.

In another example, multiple threshold values may be used to differentiate between different degrees of gripping the steering wheel. In this example, if the value indicative of the amount of power is at or below a first threshold value, the computer may determine that the driver is not holding onto the steering wheel. If the value indicative of the amount of power is greater than the first threshold value but less than or equal to a second threshold value, the computer may determine that the driver is holding the steering wheel lightly. If the value indicative of the amount of power is at or above the threshold value, the computer may determine that the driver is holding onto the steering wheel tightly. Still additional threshold values may be used to increase the number of degrees of driver grip.

Figure 8:
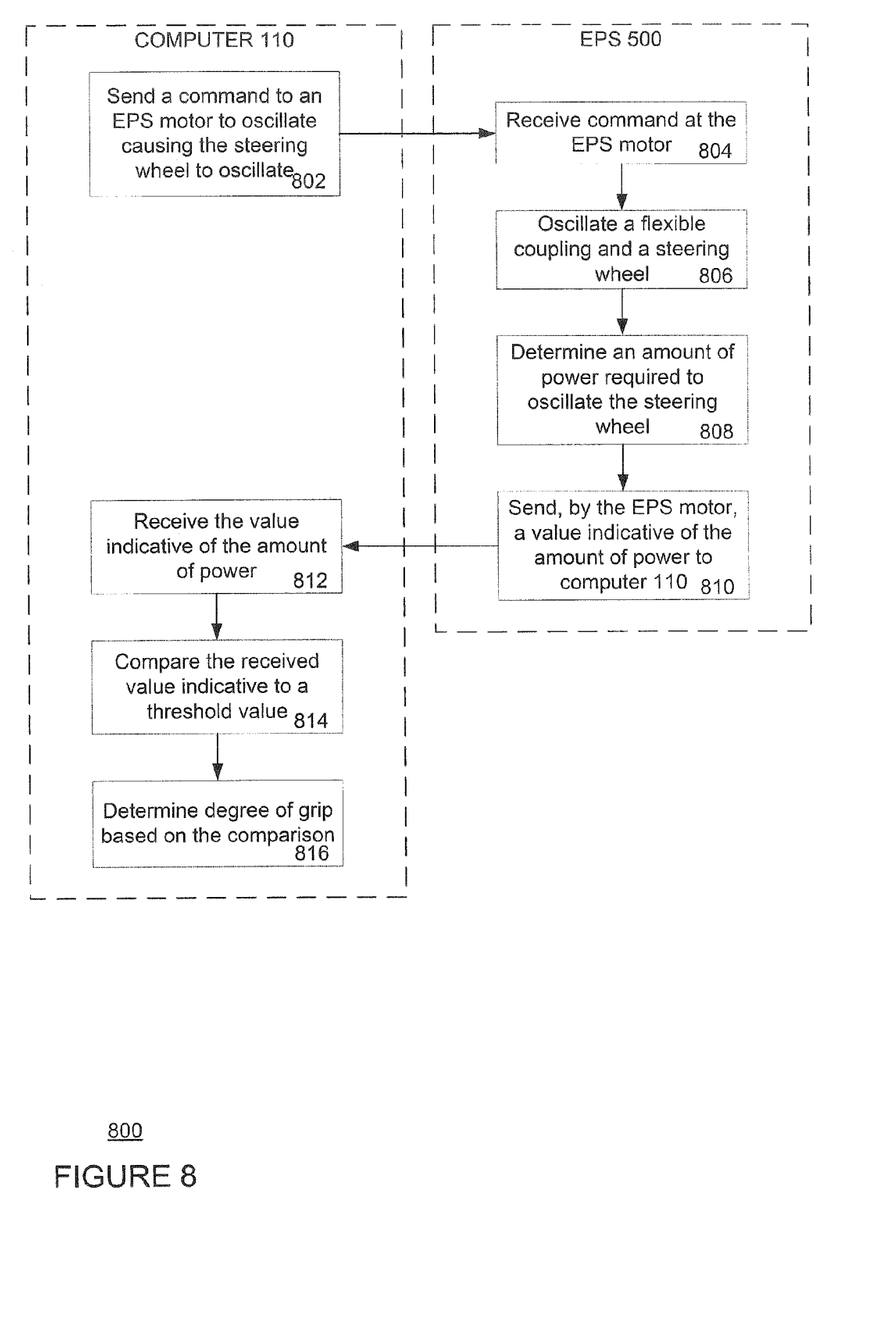
FIG. 8 is another example flow diagram in accordance with aspects of the disclosure.

FIG. 8 is an example process 800 by which a degree of a driver's grip may be determined. As noted above, this process may be used independently of the process 600 or in conjunction with process 600. In this example as shown at block 802, in order to measure the driver's grip, computer 110 may send an EPS motor of EPS system 500 a command to oscillate at very small angles (or make some other motion). The EPS motor receives this information at block 804, and the EPS motor responds by oscillating the flexible coupling and, as a consequence the steering wheel oscillates at block 806.

The EPS motor determines an amount of power required to cause the flexible coupling, and the steering wheel, to oscillate at block 808. The EPS motor sends a value indicative of this amount of power to the computer 110 at block 810. The computer 110 receives the value indicative of the amount of power at block 812 and compares the received value to a threshold value at block 814. The computer 110 then determines the degree of grip based on this comparison at block 816.

In order for the computer 110 to determine the degree of the driver's grip, some calibration steps may be employed. For example, in the EPS 400 of FIG. 4, the compliance in grip is ignored. However, the compliance in grip varies based on how hard the driver is holding on the steering wheel and the effective mass of the driver's arms. For example, a lightweight person hanging on tightly may have a similar affect as a heavier person hanging on more lightly.

A calibration procedure may include a sequence wherein during a known grip condition the computer commands the oscillation (or make some other motion) of EPS motor 430 and monitors the pattern output data. This data can be correlated to the excitation to determine calibration factors. An example of a known grip condition may include when the vehicle is turning a corner where the driver must apply a measurable torque to the steering wheel to initiate the corner. An excitation and response measurement can be taken during the corner to be used to define the condition of grip sufficient to allow safe operation of the vehicle. Alternatively this measurement can be made at repeated occasions during normal driving to generate a large quantity of data to be used for the same purpose. Alternatively, the computer may instruct the driver to apply different levels of grip during a pre-drive calibration step and use this data to create the reference grip values.

In addition, all of the features of the coupling 450 and distal steering components 450 of a typical EPS may be fairly heavy and will affect the state of the entire steering system 184. For example, if the coupling 450 and distal steering components 460 were excluded, the computer 110's comparison and calculations would be relatively simple. However, because these features are such a large (heavy) part of the steering system, this weight must be adjusted for by computer 110 by calibrating the system before comparing the data from the EPS motor. The angular position response of the motor to the commanded angular position may be a function of the dynamics of components 450 and 460. Under particularly heavy loads, the motor may display greater lag in keeping up with the commanded input (for example, the oscillation) and will require greater power to reach the commanded position. The computer may send a motor oscillation command and monitor the response of the motor and/or the power sent to the motor during the action. The response of the motor may depend on many factors including the weight of the vehicle, the air pressure in the tires, the road surface conditions, etc. The results of this calibration may not be highly critical to the performance of the grip measurement system since the input to the calculation of driver grip is based on the motor position as read directly from the motor, and not from the commanded excitation signal. Any distortion of the actual motor position from the position commanded by the computer can be separated out during the calculation of the system transfer function.

So long as the angular sensor 440 outputs the position data for the entire steering system as described above, the driver's grip can be determined without adding any additional sensors. Otherwise, a distal position sensor may be added to the system to accomplish the same result. In another alternative, one or more other sensor may be added to monitor the position of the EPS motor and/or the relative position of the steering wheel even if the EPS motor provides the relevant data and/or the torque sensor is available.

The features described herein may provide a number of benefits. For example, by determining the driver's grip, the computer 110 could determine if someone has released the steering wheel. This may occur if the driver has dosed off or otherwise become distracted. In response, the vehicle's computer could provide the driver with audible, tactile, or visual feedback or a warning.

Being able to determine whether the driver has released the steering wheel may also be important when using a self-parking (such as for parallel parking) feature of a vehicle. In this regard, the computer 110 may confirm whether the driver has actually let go of the wheel before allowing the self-parking system to take over control of the steering wheel. Again, the vehicle's computer could provide the driver with audible or visual feedback or a warning.

A key benefit of having this information is that it allows for an autonomous vehicle's computer to determine driver preparedness when the autonomous system is about to turn vehicle control back over to the driver. It is important that there be almost no likelihood of a false positive determination of a successful hand-off, leaving the driver un-prepared to control the vehicle when an autonomous mode has ended. If the driver is not prepared or incapable of controlling the vehicle the autonomous system may not relinquish control. Again, the vehicle's computer could provide the driver with audible or visual feedback or a warning encouraging the driver to grip the steering wheel. If the driver did not do so, the vehicle's computer may transition the vehicle to an alternative, safe condition. This could involve pulling off the road and parking, or some other combination of actions.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
    sending, by one or more processors, an excitation instruction to move a steering wheel of a vehicle to an electrically assisted power steering system (EPS) motor, the excitation instruction causing the EPS motor to move the steering wheel;
    calibrating, by the one or more processors, the steering system based on at least one of a characteristic of a driver and a characteristic of the steering system;
    receiving, by the one or more processors, from the EPS motor a value indicative of an amount of power required to move the steering wheel according to the excitation instruction;
    comparing the value to a threshold value; and
    determining a degree of a driver gripping the steering wheel based on the comparison.

2. The method of claim 1, wherein the calibrating comprises:
    sending the excitation instruction to move a steering wheel of a vehicle to the EPS motor during a known grip condition;
    monitoring, by the one or more processors, pattern output data during the known grip condition; and
    correlating, by the one or more processors, the pattern output data to the excitation.

3. The method of claim 2, wherein the known grip condition comprises a vehicle maneuver requiring the driver to apply a measurable torque to the steering wheel.

4. The method of claim 1, wherein the calibrating comprises:
    measuring responses to excitation signals at repeated occasions during normal driving to obtain a plurality of data; and
    adjusting the steering system based on the plurality of data.

5. The method of claim 1, wherein the characteristic of the driver includes at least one of a degree of grip of the driver and an effective mass of the driver's arms.

6. The method of claim 1, wherein the characteristic of the steering system includes a weight of the steering system.

7. The method of claim 1, wherein the calibration comprises:
    instructing the driver to apply different levels of grip prior to driving; and
    creating reference grip values based on the driver grips provided in response to the instructions.

8. The method of claim 1, wherein moving the steering wheel includes oscillating, by the EPS motor, a flexible coupling which causes the steering wheel to oscillate.

9. A system, comprising:
    at least one memory;
        one or more processors in communication with the memory, the one or more processors programmed to:
            send an excitation instruction to move a steering wheel of a vehicle to an electrically assisted power steering system (EPS) motor, the excitation instruction causing the EPS motor to move the steering wheel;
            calibrate the steering system based on at least one of a characteristic of a driver and a characteristic of the steering system;
            receive from the EPS motor a value indicative of an amount of power required to move the steering wheel according to the excitation instruction;
            compare the value to a threshold value; and
            determine a degree of a driver gripping the steering wheel based on the comparison.

10. The system of claim 9, wherein the calibrating comprises:
sending the excitation instruction to move a steering wheel of a vehicle to the EPS motor during a known grip condition;
monitoring pattern output data during the known grip condition; and
correlating the pattern output data to the excitation.

11. The system of claim 10, wherein the known grip condition comprises a vehicle maneuver requiring the driver to apply a measurable torque to the steering wheel.

12. The system of claim 9, wherein the calibrating comprises:
measuring responses to excitation signals at repeated occasions during normal driving to obtain a plurality of data; and
adjusting the steering system based on the plurality of data.

13. The system of claim 9, wherein the characteristic of the driver includes at least one of a degree of grip of the driver and an effective mass of the driver's arms.

14. The system of claim 9, wherein the characteristic of the steering system includes a weight of the steering system.

15. The system of claim 9, wherein the calibration comprises:
instructing the driver to apply different levels of grip prior to driving; and
creating reference grip values based on the driver grips provided in response to the instructions.

16. The system of claim 9, wherein moving the steering wheel includes oscillating, by the EPS motor, a flexible coupling which causes the steering wheel to oscillate.

17. A non-transitory computer-readable storage medium on which computer readable instructions of a program are stored, the instructions, when executed by a processor, cause the processor to perform a method, the method comprising:
sending an excitation instruction to move a steering wheel of a vehicle to an electrically assisted power steering system (EPS) motor, the excitation instruction causing the EPS motor to move the steering wheel;
calibrating the steering system based on at least one of a characteristic of a driver and a characteristic of the steering system;
receiving from the EPS motor a value indicative of an amount of power required to move the steering wheel according to the excitation instruction;
comparing the value to a threshold value; and
determining a degree of a driver gripping the steering wheel based on the comparison.

18. The non-transitory computer-readable storage medium of claim 17, wherein the calibrating comprises:
sending the excitation instruction to move a steering wheel of a vehicle to the EPS motor during a known grip condition;
monitoring pattern output data during the known grip condition; and
correlating the pattern output data to the excitation.

19. The non-transitory computer-readable storage medium of claim 18, wherein the known grip condition comprises a vehicle maneuver requiring the driver to apply a measurable torque to the steering wheel.

20. The non-transitory computer-readable storage medium of claim 17, wherein the calibration comprises:
instructing the driver to apply different levels of grip prior to driving; and
creating reference grip values based on the driver grips provided in response to the instructions.

* * * * *